(12) United States Patent
Shoor (10) Patent No.: US 8,077,642 B2
(45) Date of Patent: Dec. 13, 2011

(54) METHODS AND APPARATUS FOR SIGNAL ECHO CANCELLATION AND TRANSMITTER CALIBRATION IN FULL DUPLEX SYSTEMS

(75) Inventor: Ehud Shoor, Haifa (IL)

(73) Assignee: Intel Corporation, Santa Clara, CA (US)

( * ) Notice: Subject to any disclaimer, the term of this patent is extended or adjusted under 35 U.S.C. 154(b) by 989 days.

(21) Appl. No.: 11/966,216

(22) Filed: Dec. 28, 2007

(65) Prior Publication Data

US 2009/0168672 A1    Jul. 2, 2009

(51) Int. Cl.
*H04B 3/20*    (2006.01)
*H04M 9/08*    (2006.01)

(52) U.S. Cl. ............... 370/286; 365/185.09; 365/203; 370/260; 370/291; 375/222; 375/319; 375/322; 379/189; 379/406.06; 379/406.08; 379/406.11; 379/417; 455/570; 708/319; 708/322; 708/323; 711/125; 714/746

(58) Field of Classification Search .......... 370/260, 370/286, 291; 375/222, 232, 240.26; 379/189, 379/406.08, 417, 406.06, 406.11; 708/319, 708/323, 322; 714/746; 365/185.09, 203; 455/570; 711/125
See application file for complete search history.

(56) References Cited

U.S. PATENT DOCUMENTS

| | | | | |
|---|---|---|---|---|
| 4,481,622 A * | 11/1984 | Cheng et al. | ............. | 370/286 |
| 4,581,492 A * | 4/1986 | Virdee | ............. | 370/286 |
| 4,782,459 A * | 11/1988 | Johnston | ............. | 708/322 |
| 5,148,427 A * | 9/1992 | Buttle et al. | ............. | 370/291 |
| 5,757,906 A * | 5/1998 | Unno | ............. | 379/406.11 |
| 6,064,733 A * | 5/2000 | Hayashi | ............. | 379/406.06 |
| 6,205,124 B1 * | 3/2001 | Hamdi | ............. | 370/260 |
| 6,505,222 B1 * | 1/2003 | Davis et al. | ............. | 708/323 |
| 6,563,870 B1 * | 5/2003 | Schenk | ............. | 375/232 |
| 6,744,812 B2 * | 6/2004 | Anne et al. | ............. | 375/222 |
| 6,763,099 B1 * | 7/2004 | Blink | ............. | 379/189 |
| 6,952,600 B2 * | 10/2005 | Paksuniemi et al. | ............. | 455/570 |
| 7,031,461 B2 * | 4/2006 | Lipari et al. | ............. | 379/406.08 |
| 7,046,798 B2 * | 5/2006 | Betts et al. | ............. | 379/417 |
| 7,167,883 B2 * | 1/2007 | Greiss et al. | ............. | 708/319 |
| 7,409,003 B2 | 8/2008 | Vaananen et al. | | |
| 7,415,061 B2 | 8/2008 | Currivan et al. | | |
| 7,421,018 B2 | 9/2008 | Anim-Appiah et al. | | |
| 7,436,881 B2 | 10/2008 | Nedic et al. | | |
| 7,457,351 B1 | 11/2008 | Currivan et al. | | |
| 7,457,352 B2 | 11/2008 | Currivan et al. | | |
| 2008/0133994 A1 * | 6/2008 | Oh | ............. | 714/746 |

(Continued)

OTHER PUBLICATIONS

"10 Gigabit Ethernet," Wikipedia, the free encyclopedia, Jan. 12, 2009, 8 pages.

(Continued)

*Primary Examiner* — Gerald Gauthier (74) *Attorney, Agent, or Firm* — Grossman, Tucker, Perreault & Pfleger, PLLC (57) ABSTRACT

A method includes transmitting a first signal over a network from a first communication link to a second communication link. The method further includes receiving a second signal with the first communication link from the second communication link. The method further includes canceling signal echo from the first signal present in the second signal with a digital echo canceller. The method further includes providing correction data from a memory array to the digital echo canceller during the cancellation of the signal echo. An associated apparatus is also disclosed.

13 Claims, 5 Drawing Sheets

U.S. PATENT DOCUMENTS

2009/0168672 A1* 7/2009 Shoor ............................ 370/286

OTHER PUBLICATIONS

"64b/66b Encoding," Wikipedia, the free encyclopedia, Nov. 27, 2008, 2 pages.

"8b/10b Encoding," Wikipedia, the free encyclopedia, Nov. 26, 2008, 7 pages.

"Pulse-Amplitude Modulation," Wikipedia, the free encyclopedia, Oct. 30, 2008, 2 pages.

"Dirty Paper Coding," Wikipedia, the free encyclopedia, Dec. 29, 2008, 2 pages.

"Gigabit Ethernet," Wikipedia, the free encyclopedia, Jan. 5, 2009, 6 pages.

* cited by examiner

METHODS AND APPARATUS FOR SIGNAL ECHO CANCELLATION AND TRANSMITTER CALIBRATION IN FULL DUPLEX SYSTEMS

BACKGROUND

Data transmissions across network connections may implement full duplex transceivers, each containing a transmitter and receiver. During operation transmission of data from a device may result in signal echo included in a signal being received.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as types and interrelationships of system components and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Figure 1:
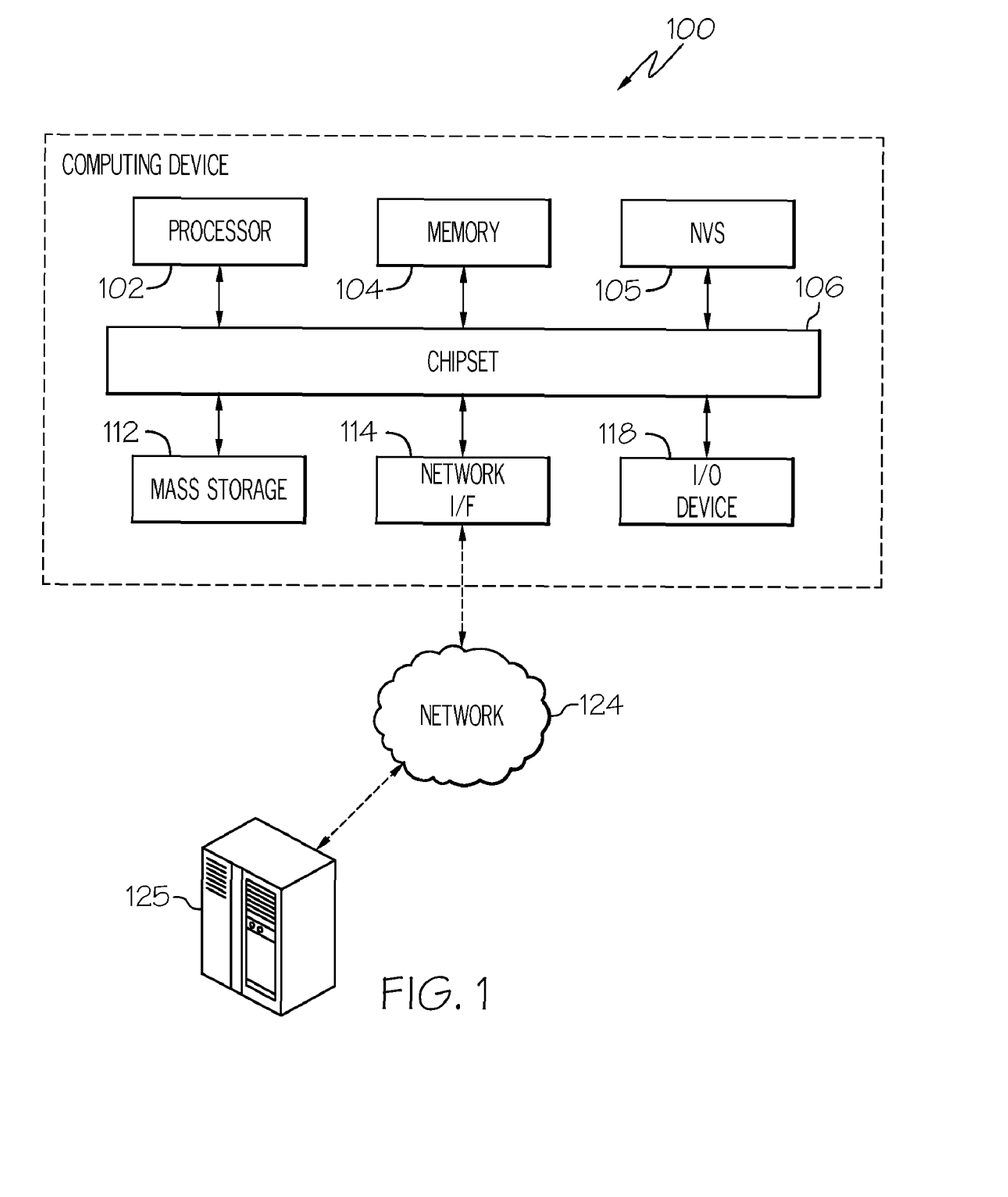
FIG. 1 shows a block diagram of an embodiment of a computing device and associated components.

Referring now to FIG. 1, one embodiment of a computing device 100 is shown. The computing device 100 may include a processor 102 and a memory 104 coupled to a chipset 106. The memory 104 may include a memory cache 132. A mass storage device 112, a non-volatile storage (NVS) device 105, a network interface (I/F) 114, and an Input/Output (I/O) device 118 may also be coupled to the chipset 106. Embodiments of computing device 100 include, but are not limited to, a desktop computer, a notebook computer, a server, a personal digital assistant, a network workstation, or the like. In one embodiment, the processor 102 may execute instructions stored in memory 104.

The processor 102 may include, but is not limited to, processors manufactured or marketed by Intel Corp., IBM Corp., and Sun Microsystems Inc. In one embodiment, computing device 100 may include multiple processors 102. The processors 102 may also include multiple processing cores. Accordingly, the computing device 100 may include multiple processing cores for executing instructions of the computing device 100.

The memory 104 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. In one embodiment, the memory 104 may include one or more memory units that do not have to be refreshed.

The chipset 106 may include a memory controller, such as a Memory Controller Hub (MCH), an input/output controller, such as an Input/Output Controller Hub (ICH), or the like. In an alternative embodiment, a memory controller for memory 104 may reside in the same chip as processor 102. The chipset 106 may also include system clock support, power management support, audio support, graphics support, or the like. In one embodiment, chipset 106 is coupled to a board that includes sockets for processor 102 and memory 104.

The components of computing device 100 may be connected by various interconnects. In one embodiment, an interconnect may be point-to-point between two components, while in other embodiments, an interconnect may connect more than two components. Such interconnects may include a Peripheral Component Interconnect (PCI), such as PCI Express, a System Management bus (SMBUS), a Low Pin Count (LPC) bus, a Serial Peripheral Interface (SPI) bus, an Accelerated Graphics Port (AGP) interface, or the like. I/O device 118 may include a keyboard, a mouse, a display, a printer, a scanner, or the like.

The computing device 100 may interface to external systems through network interface 114. The network interface 114 may include, but is not limited to, a modem, a Network Interface Card (NIC), or other interfaces for coupling a computing device to other computing devices. A carrier wave signal 123 may be received/transmitted by network interface 114. In the embodiment illustrated in FIG. 1, carrier wave signal 123 is used to interface computing device 100 with a network 124, such as a Local Area Network (LAN), a Wide Area Network (WAN), the Internet, or any combination thereof. In one embodiment, network 124 is further coupled to a computing device 125 such that computing device 100 and computing device 125 may communicate over network 124.

The computing device 100 also includes non-volatile storage 105 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like.

The mass storage 112 may include, but is not limited to, a magnetic disk drive, such as a hard disk drive, a magnetic tape drive, an optical disk drive, or the like. It is appreciated that instructions executable by processor 102 may reside in mass storage 112, memory 104, non-volatile storage 105, or may be transmitted or received via network interface 114.

In one embodiment, the computing device 100 may execute an Operating System (OS). Embodiments of an OS include Microsoft Windows®, the Apple Macintosh operating system, the Linux operating system, the Unix operating system, or the like.

In one embodiment, the network interface 114 may be used to communicate over a network in full duplex using 1GBaseT or 10GBaseT Ethernet, for example. In transmissions over a network, one consideration is that of transmitter linearity. Transmitter linearity considerations may involve the quality of the transmitted signal and the ability to suppress echo at the receiver. In various communication systems such as such as 1GBaseT and 10GBaseT Ethernet, for example, transmitted symbols are modulated by different voltage levels. Hence, a transmitter may be expected to output a corresponding voltage level for every symbol which may be used implement Pulse-Amplitude-Modulation, for example.

In an ideal case, a constant scaling factor may transform the symbol values into voltages appropriate for transmission. However, in practical implementations, the conversion process is performed by analog circuitry may be non-linear resulting from issues such as analog impairments, e.g., transistor mismatch. Such deviation from a constant scaling ratio is considered as a static non-linearity of the transmitter, and imposes the above mentioned implications.

For example, in a system which employs 5 possible output levels, ideal mapping may be:

TABLE 1

| Symbol Value | Output-Voltage |
|---|---|
| −2 | −1 V |
| −1 | −0.5 V |
| 0 | 0 V |
| 1 | 0.5 V |
| 2 | 1 V |

However, in a practical implementation the actual mapping might vary from the optimal setting such that:

TABLE 2

| Symbol Value | Output-Voltage |
|---|---|
| −2 | −0.94 V |
| −1 | −0.55 V |
| 0 | 0.07 V |
| 1 | 0.4 V |
| 2 | 1.01 V |

Figure 2:
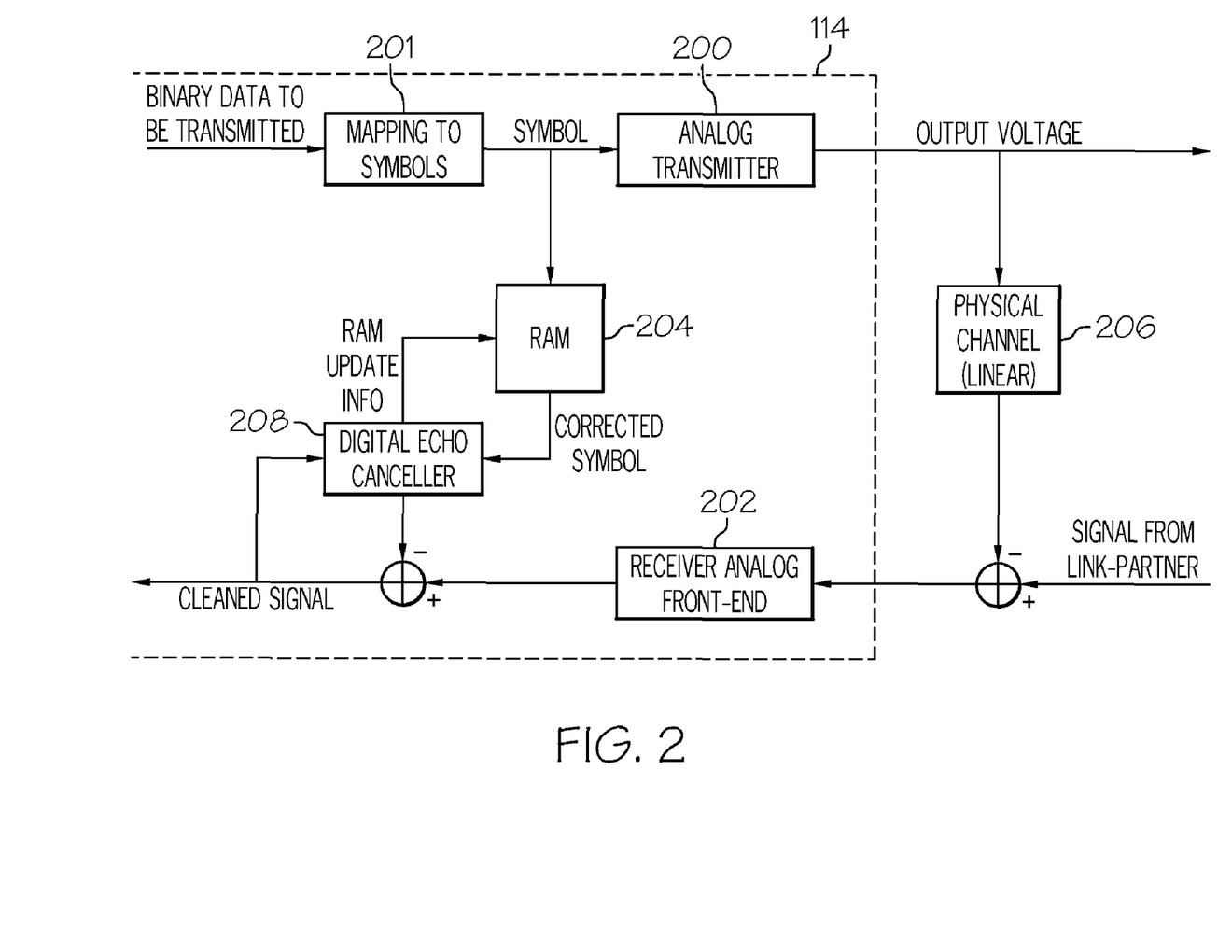
FIG. 2 shows a block diagram of an embodiment of a network interface.

Referring now to FIG. 2, there is shown an embodiment of the network interface 114. A network interface, such as network interface 114, may experience echo during transmission, which results in transmitted data from a transmitter 200 being reflected back to a receiver 202 and added to the incoming signal from a link-partner (e.g., signal received from the link partner transmitter). In the network interface 114, binary data is transmitted to a mapping device 201, which converts the binary data into a symbol for transmission. The echo path may start from the analog transmitter 200, going through the board connections (e.g. transformer and connectors with impedance mismatch that distort the signal) and sampled by a local analog-to-digital converter together with the far-end signal, e.g., other end of the network connection communication link.

In an ideal case, if the transmitted data is known and the echo transfer function (e.g. "channel") from the local transmitter 200 to an analog-to-digital converter is known, then by knowing the input and the corresponding transfer function, the output may be determined and may be subtracted from the received signal. However, while a digital echo canceller 208 may perform its echo signal calculation that the ideal output levels were transmitted, the actual transmitted data which is convolved with the echo channel and creates the echo signal is not as expected, since it contains the above mentioned non-linearity in the analog transmitter as shown in Table 2.

Therefore, even if physical channel 206 is accurately estimated in the receiver, the cancellation would not be perfect since the digital echo canceller 208 output would not match the echo signal input. However, if the actual transmitted data is known, it may be entered into digital echo canceller calculations, allowing the echo canceller 208 to operate more accurately.

In one embodiment of the network interface 114, the ideal symbol may be utilized as an address pointer to its corresponding corrected value in a memory array 204, which, in one embodiment, may be a RAM look-up-table as illustrated in FIG. 2. In another embodiment, the memory array 204 may store the correction factor and add it to the ideal symbol so the echo canceller 208 may get the sum of the two.

In one example, the correction factor that corresponds to the $i^{th}$ level is $\epsilon^{(i)}$. Therefore, the corrected symbol may be represented as:

$$\text{corrected\_symbol}^{(i)} = \text{ideal\_symbol}^{(i)} + \epsilon^{(i)} \tag{1}$$

Or alternatively:

$$\text{corrected\_symbol}^{(i)} = \text{ideal\_symbol}^{(i)} \cdot \alpha^{(i)}, \tag{2}$$

$$\text{where } \alpha^{(i)} = 1 + \frac{\epsilon^{(i)}}{\text{ideal\_symbol}^{(i)}}$$

Using these equations, processing of the correction symbols may base on the echo canceller hardware, which may contains an adaptive coefficient control (e.g. using a LMS algorithm).

Figure 3:
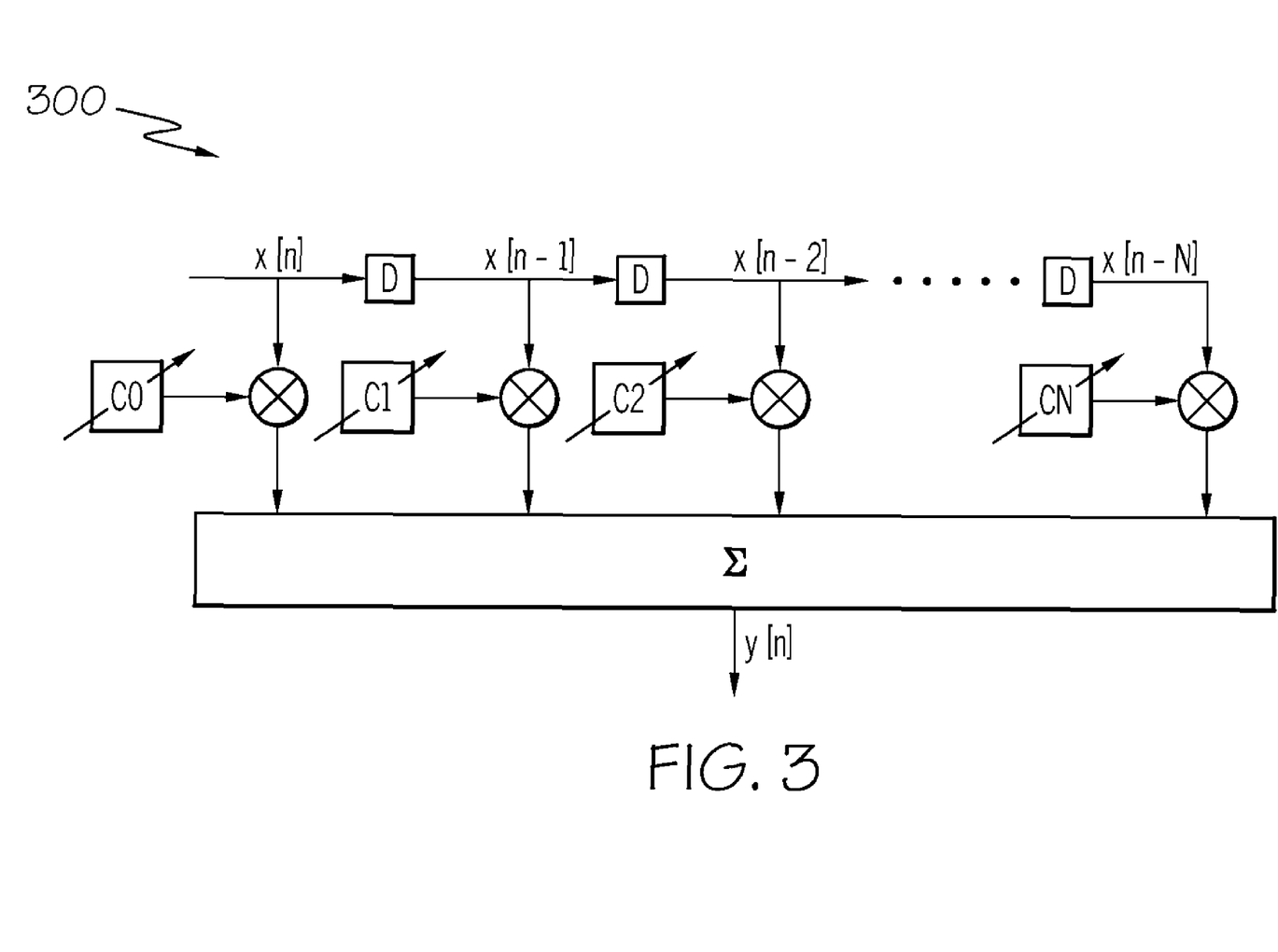
FIG. 3 shows a block diagram of an embodiment of an adaptive filter.

Referring now to FIG. 3 a block diagram of an adaptive filter 300 is shown. In the example, "x" indicates an input at various times to the filter and "y" is designated as the output. Variable "c" indicates a coefficient. In this example, it may be assumed that at a certain time-index n−k, the required symbol for transmission is $S^{(i)}$. Following the look-up-table methodology of proportional correction factors $\alpha^{(i)}$, the echo-canceller reference input may be $x[n-k]=S^{(i)}\cdot\alpha^{(i)}$. Therefore, the product term $c[k]\cdot x[n-k]$ may be expressed as $c[k]\cdot\alpha^{(i)}\cdot S^{(i)}$, so it may be interpreted such that the input $S^{(i)}$ is multiplied by the coefficient ($c[k]\cdot\alpha^{(i)}$). By following this methodology, the adaptive coefficients control may update the combined coefficient ($c[k]\alpha^{(i)}$) and not only $c[k]$. If the algorithm advises to increase the coefficient, so both $c[k]$ and $\alpha^{(i)}$ will be increased, and the same holds for decrease update. Thus, the adaptation step may be used to update the memory array 204 correction factors in parallel to the echo-canceller coefficient. This method may apply to the adaptive algorithm on the reference data as well as on the original coefficients. As soon as the correction factors and the coefficients converge, performance of the echo canceller 208 may be optimal. Since equations (1) and (2) are equivalent, embodiments of the memory array 204 may implement either the additive or proportional correction table.

Figure 4:
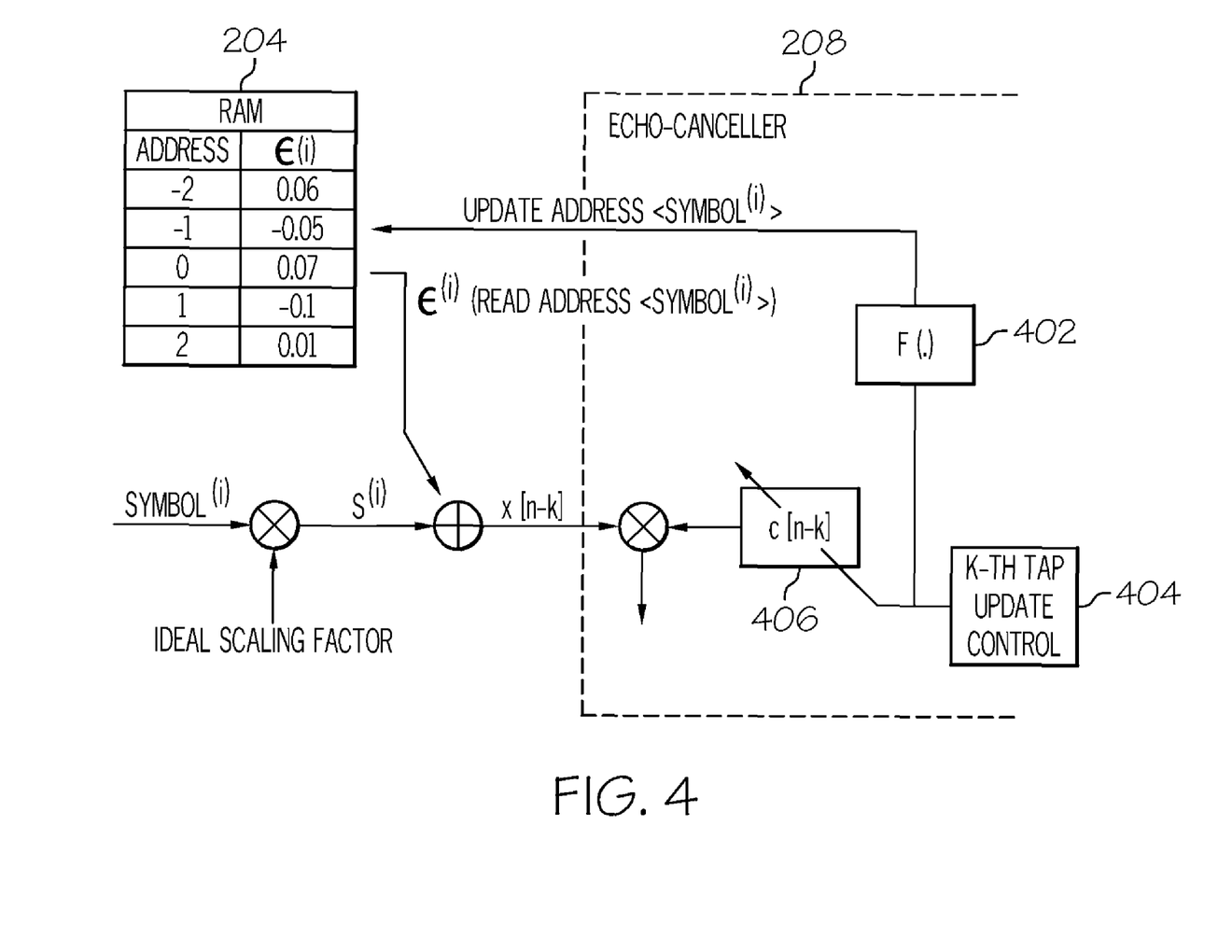
FIG. 4 shows a block diagram of an embodiment of a digital echo canceller.

Referring now to FIG. 4, there is shown a block diagram of an embodiment of the echo canceller 208 implementing a 5 level system (i.e. 5 rows RAM). The block 402 in the echo canceller 208 represents an optional manipulation over an adaptation signal, since there may not be a requirement that the adaptation step to the echo-canceller coefficient would be exactly the same the reference input correction factor. It should be also appreciated that the explicit multiplication with the ideal scaling factor may be skipped, such that it may be embedded in the adaptive parameters, which are expected to converge to a value that considers this scaling factor. The described update mechanism may be duplicated for each of the filter's taps, as indicated by block 404 (and not only to the one that corresponds to $x[n-k]$ input), allowing fast convergence of the RAM parameters. However, in other embodiments, it may be possible to reduce the convergence speed with hardware complexity by enabling correction method only for some of the taps. Block 406 represents the "k'th" coefficient of the echo canceller 208 having its value set by an adaptive control mechanism.

In another embodiment the transmitted signal itself may be calibrated through implementation of another RAM that may operate as a look-up-table for the transmit signal calibration. Therefore, instead of driving the transmitter with a certain input, the transmitter 200 may be fed by a calibrated value such that the output would be linear. In one embodiment, the transmit calibration accuracy is a function of the transmitter D/A converter resolution.

To calibrate the signal, various properties of the optimization problem, may be considered. The algorithm previously described herein allows extracting the combined set $\{\{c_i\}_{i=1}^{num\ of\ coeffs}, \{\alpha_i\}_{i=1}^{num\ of\ levels}\}$ (or $\{\{c_i\}_{i=1}^{num\ of\ coeffs}, \{\epsilon_i\}_{i=1}^{num\ of\ levels}\}$), which may bring the echo cancellation performance to optimality. However, due to the specific optimization problem formulation, the correction factors $\alpha(i)$ (or $\epsilon(i)$) may not represent the exact non-linearity voltage at the transmitter, but a value which is proportional to the actual transmitter error. One reason for this property may be the specific optimization criterion, where the product of the echo canceller coefficients and the transmit correction factors is the optimization target. According to this setting, if a specific solution set of coefficients and correction factors is $\{\{c_i\}_{i=1}^{num\ of\ coeffs}, \{\alpha_i\}_{i=1}^{num\ of\ levels}\}$, so that $$\left\{\{A\cdot c_i\}_{i=1}^{num\ of\ coeffs}, \left\{\frac{1}{A}\cdot\alpha_i\right\}_{i=1}^{num\ of\ levels}\right\}$$

is also a valid solution for any real value A, because the product remains the same. As will be further described herein, the transmit calibration is strongly tied with the memory array 204, which serves as its sensor. Therefore, the echo canceller correction values may be predictable and consistent.

In one embodiment, a convergence flow may be implemented to increase robustness. The flow may include disablement of memory array 204 and letting the echo canceller coefficients converge. The flow may further include selection of one arbitrary symbol and setting its corresponding correction factor to be $\epsilon(ref\_sym)=0$ (or $\alpha(ref\_sym)=1$). This factor may not be updated, and thus serves as a reference level. The flow further includes activating the memory array 204 (except for the reference level) and let the combined coefficients/correction factors converge together. The initial correction values may be zeros for the additive representation ($\epsilon$'s) or ones in the product representation ($\alpha$'s). Assuming that the correction factors are less dominant than the echo canceller coefficients (since they are much smaller), the optimization problem solution may be only fine-tuned so the correction factors will remain small after the memory array 204 enabling, hence predictable for any practical design consideration. Additionally, by forcing one level value to be constant, the above proportional factor "A" may be set uniquely, so that the convergence would be repeatable and consistent.

Figure 5:
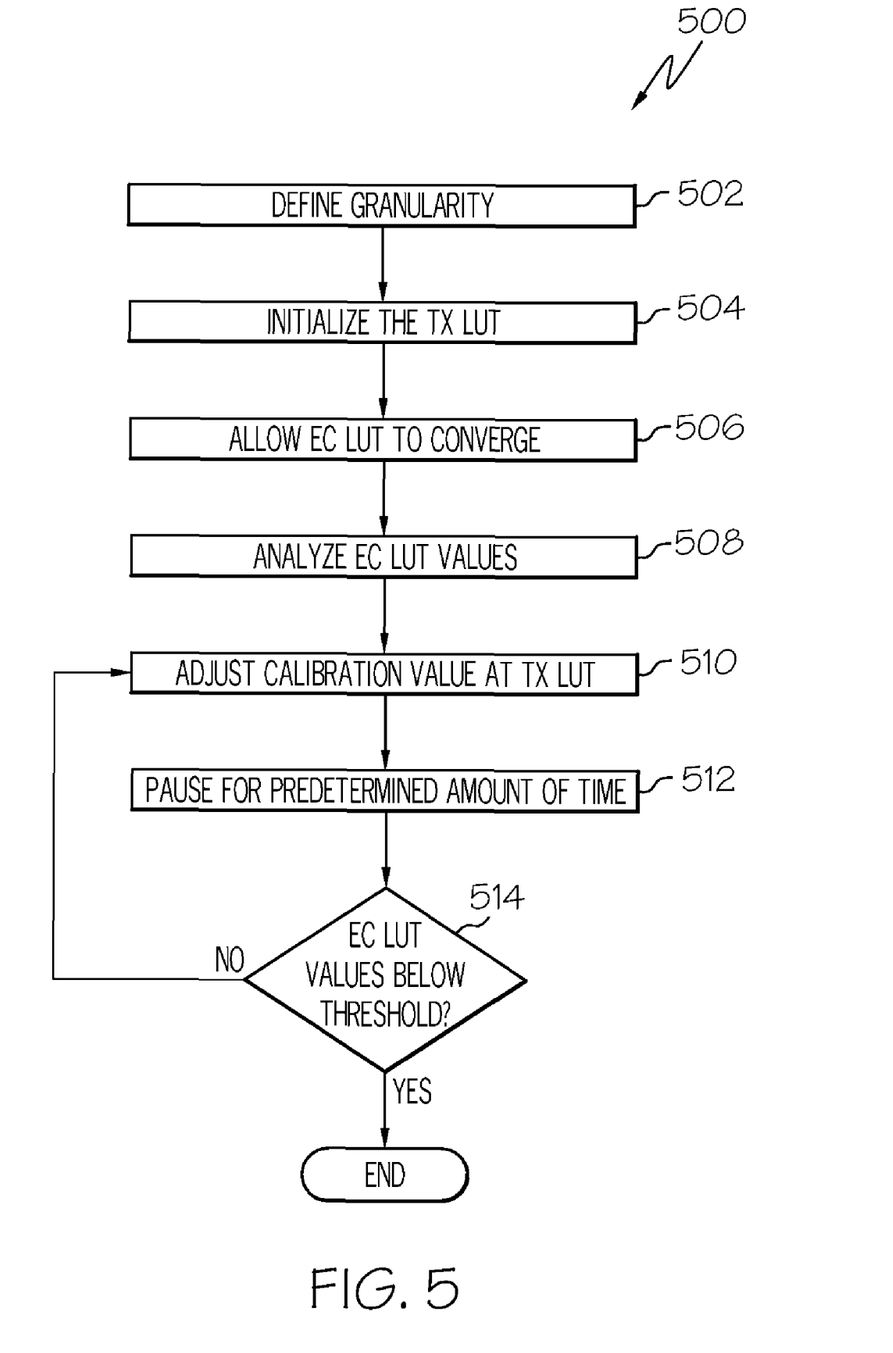
FIG. 5 shows a flowchart of an embodiment of a routine for calibrating a digital transmitter.

Since the transmitter is not linear, the correction factors which were obtained for the echo cancellation calibration may not be subtracted from the ideal transmitter input. However, a conclusion may be made that a positive correction for the echo canceller reference of a certain level indicates that the corresponding transmitter output is larger than expected (and vice-versa for negative correction factors). Therefore, in one embodiment a transmitter calibration method may be implemented. FIG. 5 shows a flowchart 500 of a routine implementing an embodiment of the calibration method. At block 502, the routine may include defining a granularity for the transmitter calibration process. In one embodiment, this value may half the transmitter D/A converter LSB. At block 504, the routine may further include initializing a transmitter look-up-table (TX LUT), such as a memory array, with constant zeros. At block 506, the routine may include allowing the echo-canceller LUT (EC LUT) to converge as previously described above. At block 508, the routine may further include, for each symbol, analyzing the EC LUT values and finding the corrections which exceed the granularity threshold. At block 510, the routine may include adjusting the calibration value at the TX LUT. For these symbols—if the transmitter calibration value is positive (i.e. the transmitter output is too large), the corresponding level at the transmitter 200 may be decreased. If the transmitter calibration value is negative (i.e. the transmitter output is too small), the corresponding level at the transmitter 200 LUT may be increased. At block 512, the method may further include observing the EC LUT after a predetermined amount of time. At block 514 it is determined if the EC LUT values are below the threshold. If so, the observed signal non-linearity at the echo-canceller sensor is small enough and the routine may end. If not, the routine may repeat blocks 510 and 512 until all the echo-canceller values are below the threshold.

The described linearization process may not constrain the resultant dynamic range. Therefore, in one embodiment, the converged values may be scaled according to one of the extreme symbols, i.e. multiply all the levels such that the extreme symbol will correspond to the maximal D/A code. In another embodiment, to select the non-adaptive reference level may be selected to be one with a large magnitude (positive or negative), allowing it to serve as an anchor that ensures sufficient dynamic range.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A method comprising:
   transmitting a first signal over a network from a first communication link to a second communication link,
   receiving a second signal with the first communication link from the second communication link,
   canceling signal echo from the first signal present in the second signal with a digital echo canceller, and
   providing correction data from a memory array to the digital echo canceller during the cancellation of the signal echo.

2. The method of claim 1, further comprising updating the correction data of the memory array during cancellation of the signal echo.

3. The method of claim 2, wherein the providing correction data comprises providing updated correction data from a memory array to the digital echo canceller during the cancellation of the signal echo.

4. The method of claim 2, wherein the updating the correction data of the memory array comprises updating the correction data of the memory array with output from the digital echo canceller.

5. The method of claim 2, wherein the updating the correction data of the memory array comprises updating the correction data with a gradient-based adaptive algorithm.

6. The method of claim 5, wherein the updating the correction data of the memory array comprises updating the correction data with a least means square algorithm.

7. The method of claim 1, further comprising providing a symbol representing the first signal as an address pointer to the memory array.

8. An apparatus comprising:
   an analog transmitter having an input and an output,
   a memory array, the memory array having a first input defined as the input of the analog transmitter, a second input, and an output to provide correction data,
   a digital echo canceller having a first input defined as the output of the memory array, a second input, a first output defining the second input of the memory array to provide update data to the memory array, and a second output to provide a signal indicative of predicted signal echo, and
   a receiver having an input for receiving a transmitted signal, wherein the second output of the digital echo canceller is subtracted from the transmitted signal to create a cleaned signal, the cleaned signal defining the second input of the digital echo canceller.

9. The apparatus of claim 8, wherein the analog transmitter comprises a digital-to-analog converter.

10. The apparatus of claim 8, wherein the memory array comprises random access memory.

11. The apparatus of claim 8, wherein the memory array includes a table having a plurality of communication symbols and corresponding transmission levels stored therein.

12. The apparatus of claim 11, wherein the digital echo canceller executes a gradient-based adaptive algorithm to determine update data provided to the memory array to update the corresponding transmission voltage values.

13. The apparatus of claim 12, wherein the gradient-based adaptive algorithm is a least means square algorithm.

* * * * *